US012654635B2

(12) United States Patent
Shida et al.

(10) Patent No.: US 12,654,635 B2
(45) Date of Patent: Jun. 16, 2026

(54) WIRE HARNESS AND WIRE HARNESS WITH BASE MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tomoka Shida, Osaka (JP); Satoshi Yamamoto, Osaka (JP); Masami Ono, Osaka (JP); Yuuta Inoue, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 209 days.

(21) Appl. No.: 18/567,156

(22) PCT Filed: Jun. 9, 2022

(86) PCT No.: PCT/JP2022/023281
§ 371 (c)(1),
(2) Date: Dec. 5, 2023

(87) PCT Pub. No.: WO2022/270324
PCT Pub. Date: Dec. 29, 2022

(65) Prior Publication Data
US 2024/0262302 A1 Aug. 8, 2024

(30) Foreign Application Priority Data
Jun. 21, 2021 (JP) ................................. 2021-102393

(51) Int. Cl.
B60R 16/02 (2006.01)
H01B 7/00 (2006.01)

(52) U.S. Cl.
CPC ....... B60R 16/0215 (2013.01); H01B 7/0045 (2013.01)

(58) Field of Classification Search
CPC ...... B60R 6/0207; B60R 6/0215; H02G 3/04; H02G 3/30; H01B 7/0045
See application file for complete search history.

(56) References Cited

U.S. PATENT DOCUMENTS 6,392,148 B1 * 5/2002 Ueno .................... H01R 12/613
                                                            174/72 A
7,521,634 B2 * 4/2009 Clem ................. G01R 1/06788
                                                            174/72 A
(Continued)

FOREIGN PATENT DOCUMENTS

JP        H08-163742 A      6/1996
JP        2010-018106 A1    1/2010
(Continued)

OTHER PUBLICATIONS

International Search Report issued on Aug. 30, 2022 for WO 2022/270324 A1 (4 pages).

*Primary Examiner* — Paresh Paghadal
(74) *Attorney, Agent, or Firm* — Venjuris, P.C.

(57) ABSTRACT

A wire harness is attached to a seat of the vehicle. The wire harness includes a plurality of electric wires and a protective member covering intermediate portions of the plurality of electric wires. The plurality of electric wires branch into three or more branch lines inside of the protective member. The protective member includes a first sheet member and a second sheet member sandwiching the intermediate portions of the plurality of electric wires. An outer edge of the protective member is provided with extension ports through (Continued)

which the respective three or more branch lines extend outside of the protective member. Fixing portions at which the first sheet member and the second sheet member are fixed to each other are provided adjacent to the extension ports on the outer edge of the protective member.

10 Claims, 10 Drawing Sheets

(56)                    References Cited

U.S. PATENT DOCUMENTS

| | | | | |
|---|---|---|---|---|
| 9,481,327 B2 * | 11/2016 | Shibata | .................. | H02G 3/083 |
| 2019/0252092 A1 * | 8/2019 | Mizuno | .............. | B60R 16/0215 |
| 2022/0293299 A1 * | 9/2022 | Kudo | ........................ | H02G 3/30 |
| 2022/0388461 A1 * | 12/2022 | Kudo | .................... | F16B 19/004 |

FOREIGN PATENT DOCUMENTS

| | | | | | |
|---|---|---|---|---|---|
| JP | 2012051494 | * | 3/2012 | .............. | B60N 2/44 |
| JP | 201027242 | * | 2/2014 | .............. | H01B 7/00 |
| JP | 2015-110424 A | | 6/2015 | | |
| WO | 2017/073449 A1 | | 5/2017 | | |

* cited by examiner

WIRE HARNESS AND WIRE HARNESS WITH BASE MEMBER

CROSS REFERENCE TO RELATED APPLICATIONS

This application is a national phase of PCT application No. PCT/JP2022/023281, filed on 9 Jun. 2022, which claims priority from Japanese patent application No. 2021-102393, filed on 21 Jun. 2021, all of which are incorporated herein by reference.

TECHNICAL FIELD

The present disclosure relates to a wire harness and a wire harness with a base member.

BACKGROUND

Patent Document 1 discloses a wire harness that is to be attached to a seat of a vehicle. In the wire harness described in the patent document, terminal portions are bound together with adhesive tape.

PRIOR ART DOCUMENT

Patent Document

Patent Document 1: JP 2015-110424 A

SUMMARY OF THE INVENTION

Problems to be Solved

In the wire harness described in Patent Document 1, the task of wrapping the adhesive tape, the task of attaching the exterior member and the fixing member, and the like require labor. Also, it is necessary to route multiple branch lines one by one over a long section, and the task of routing the wire harness also requires labor.

In view of this, it is an object of the present invention to provide a technique that simplifies manufacturing and routing of a wire harness to be attached to a seat of a vehicle.

Means to Solve the Problem

The wire harness of the present disclosure is a wire harness to be attached to a seat of a vehicle, including: a plurality of electric wires; and a protective member covering intermediate portions of the plurality of electric wires, in which the plurality of electric wires branch into three or more branch lines inside of the protective member, the protective member includes a first sheet and a second sheet sandwiching the intermediate portions of the plurality of electric wires, an outer edge of the protective member is provided with extension ports through which the respective three or more branch lines extend outside of the protective member, and fixing portions to which the first sheet member and the second sheet member are fixed to each other are provided adjacent to the extension port on the outer edge of the protective member.

Effect of the Invention

According to the present disclosure, manufacturing and routing of a wire harness to be attached to a seat of a vehicle are simplified.

DESCRIPTION OF EMBODIMENTS

Figure 1:
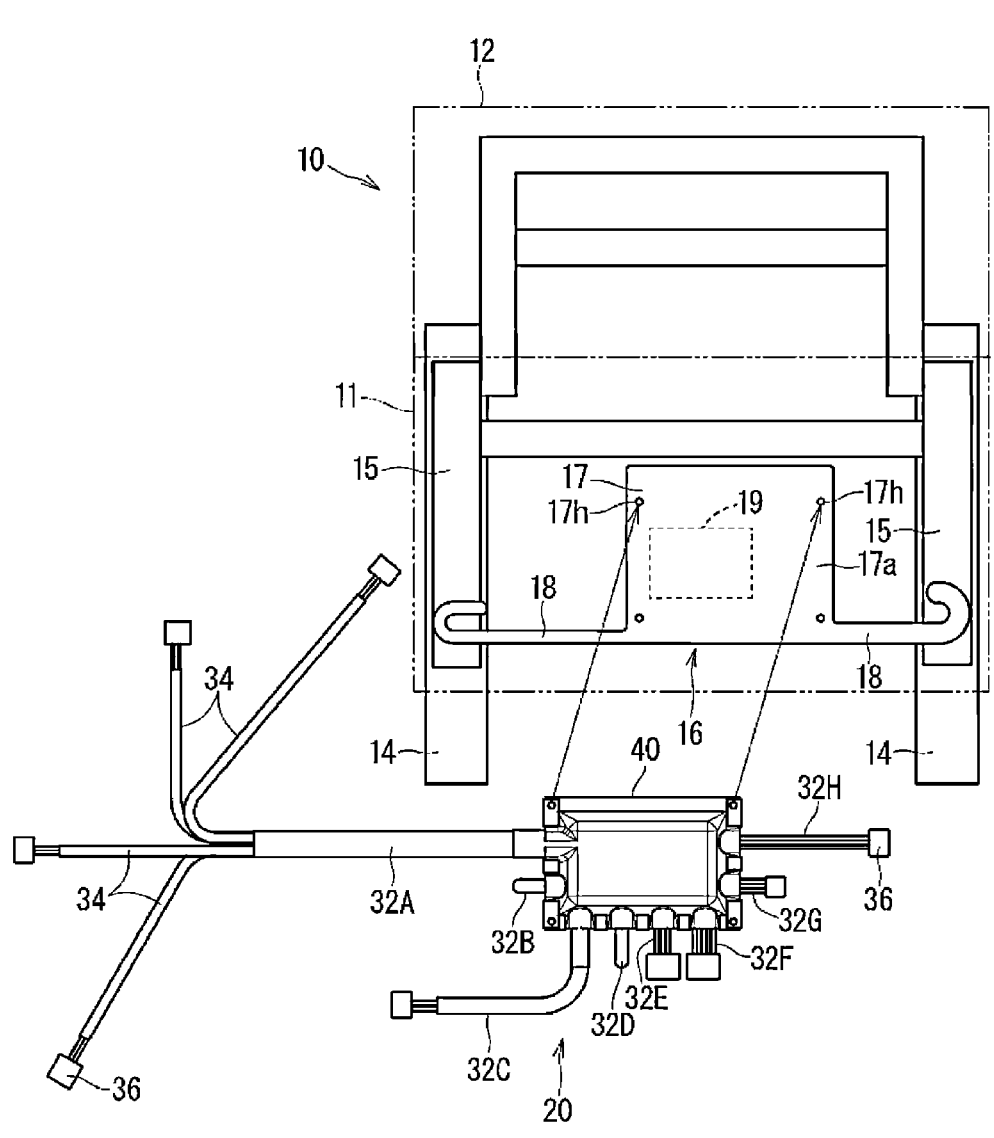
FIG. 1 is a schematic plan view showing a wire harness according to a first embodiment and a seat to which the wire harness is to be attached.

Description of Embodiments of the Present Disclosure

First, embodiments of the present disclosure will be listed and described.

The wire harness of the present disclosure is as follows.

(1) A wire harness to be attached to a seat of a vehicle, including: a plurality of electric wires; and a protective member covering intermediate portions of the plurality of electric wires, in which the plurality of electric wires branch into three or more branch lines inside of the protective member, the protective member includes a first sheet and a second sheet sandwiching the intermediate portions of the plurality of electric wires, an outer edge of the protective member is provided with extension ports through which the respective three or more branch lines extend outside of the protective member, and fixing portions to which the first sheet member and the second sheet member are fixed to each other are provided adjacent to the extension port on the outer edge of the protective member. The protective member collectively protects the intermediate portions of the plurality of electric wires including the branch portions. This simplifies manufacturing of a wire harness that is to be attached to a seat of a vehicle. Also, when the portion of the wire harness provided with the protective member is installed on the base member of the seat, the intermediate portions of the plurality of electric wires where the protective member is provided are arranged along predetermined paths, and each branch line extends out from a predetermined extension port. This simplifies the routing of the wire harness to be attached to the seat of the vehicle.

(2) In the wire harness of (1), the fixing portions may include a folded fixing portion in which one of the first sheet member and the second sheet member is folded back and fixed so as to overlap with an outer surface of the other of the first sheet member and the second sheet member. This prevents the electric wires from being caught when the fixing portions are provided. Even if a large number of extension ports are provided, the outer edge of the protective member can be reliably fixed.

(3) In the wire harness of (2), only a first folded fixing portion in which the first sheet member is folded back to overlap with the outer surface of the second sheet member may be provided as the folded fixing portion. This simplifies formation of the folded fixing portion.

(4) In the wire harness of (2), the folded fixing portion may include a first folded fixing portion in which the first sheet member is folded back to overlap with the outer surface of the second sheet member, and a second folded fixing portion in which the second sheet member is folded back to overlap with the outer surface of the first sheet member. As a result, both the first sheet member and the second sheet member are folded back, whereby the fixing portions are easily kept in a fixed state.

(5) In the wire harness of any one of (1) to (4), a through hole for fixing the protective member to a base member of the seat may be formed in the protective member. As a result, the protective member can be easily fixed to the base member using the through hole.

(6) In the wire harness of (5), the through hole may be formed at a position at which the first sheet member and the second sheet member overlap with each other. This increases the strength of the through hole.

(7) In the wire harness of any one of (1) to (6), the extension ports may include a first extension port provided such that the branch lines can be moved in and out of the protective member. As a result, the branch lines can be drawn out from the protective member and connected when connecting a connector or the like.

(8) In the wire harness of any one of (1) to (7), the extension ports may include a second extension port obtained by wrapping a branch line among the branch lines and the protective member with tape. This determines the length from the protective member to the end of the branch line.

(9) In the wire harness of (7), the extension ports may include a second extension port obtained by wrapping a branch line among the branch lines and the protective member with tape, a branch line with the shortest length from the protective member to a terminal portion of the branch line among the three or more branch lines may extend from the first extension port, and a branch line with the longest length from the protective member to a terminal portion of the branch line among the three or more branch lines may extend from the second extension port. As a result, when connecting the connector, the short branch line can be drawn out from the protective member and connected, making it easier to connect the connector. Also, the long branch line is prevented from being caught on surrounding members and being unnecessarily drawn out from the protective member during transport or the like.

(10) Also, a wire harness with a base member according to the present disclosure includes: the wire harness of any one of (1) to (9); and a base member to be attached to the seat, in which the protective member is attached to the base member. As a result, since the protective member is attached to the base member, the intermediate portion of the wire harness can be placed along a predetermined path on the seat by attaching the base member to the seat.

Details of Embodiments of the Present Disclosure

Specific examples of the wire harness of the present disclosure will be described below with reference to the drawings. Note that the present disclosure is not limited to these examples, but is indicated by the scope of the claims, and all changes within the meaning and scope equivalent to the scope of the claims are intended to be encompassed therein.

First Embodiment

Hereinafter, a wire harness according to a first embodiment will be described.

First, a seat to which a wire harness is to be attached will be described with reference to FIG. 1. FIG. 1 is a schematic plan view showing a wire harness 20 according to a first embodiment and a seat 10 to which the wire harness 20 is to be attached.

The seat 10 typically has a seat portion 11 and a backrest portion 12 rotatably connected to the seat portion 11. The seat 10 is slidably attached to the vehicle body, for example, via a frame 13 provided below the seat portion 11. The frame 13 includes a pair of rails 14, a pair of sliders 15, and a base member 16. The pair of rails 14 are fixed to a floor portion of the vehicle body. The pair of rails 14 typically extend in a front-rear direction of the vehicle and are spaced apart from each other in a left-right direction of the vehicle. A slider 15 is attached to each rail 14. The sliders 15 are connected to the rails 14 so as to be slidable along the direction in which the rails 14 extend. The seat 10 is fixed to the sliders 15 or the like and moves integrally with the sliders 15. This allows the seat 10 to be slidable relative to the vehicle body in the front-rear direction of the vehicle.

The base member 16 extends in the direction in which the pair of sliders 15 are arranged side by side. The base member 16 is slidable with respect to the rails 14 together with the sliders 15. The base member 16 connects the pair of sliders 15. The base member 16 of the present disclosure supports the wire harness 20. The base member 16 may also support a device 19 to which the wire harness 20 is connected. Such a device 19 may be, for example, a motor or an ECU (electronic control unit). The base member 16 may be made of metal or resin. The base member 16 is preferably a rigid member. This allows the base member 16 to firmly support the wire harness 20 and the like.

In the example shown in FIG. 1, the base member 16 has a main body portion 17 and a pair of arm portions 18. The main body portion 17 is arranged between the pair of sliders 15. The main body portion 17 is arranged in the space below the seat portion 11 of the seat 10 (the space between the seat portion 11 and the floor portion of the vehicle body). The pair of arm portions 18 extend from the main body portion 17 to both sides. The leading end of each arm 18 is fixed to a corresponding slider 15.

The main body portion 17 has a support surface 17a. A protective member 40 of the wire harness 20 is supported on the support surface 17a. In the example shown in FIG. 1, the upper surface of the main body portion 17 is the support surface 17a. The lower surface of the main body portion 17 may also serve as the support surface 17a. In the example shown in FIG. 1, the support surface 17a is a flat surface. The support surface 17a may also have an inclined surface. The support surface 17a may also have a plurality of flat surfaces having different heights. The plurality of flat surfaces may be connected by an inclined surface. Also, in the example shown in FIG. 1, the support surface 17a has a rectangular shape in a plan view. The support surface 17a may also have a shape other than a rectangular shape in a plan view.

An attached portion for attaching the wire harness 20 may also be provided on the support surface 17a. In the example shown in FIG. 1, attachment holes 17h are provided as the attached portions. The attached portions may be provided at multiple locations. The wire harness 20 is attached to the base member 16 in a predetermined orientation by respectively attaching a plurality of locations of the wire harness 20 to the plurality of attached portions. In the example shown in FIG. 1, an attached portion is provided at each of the four corners of the rectangular support surface 17a.

Figure 2:
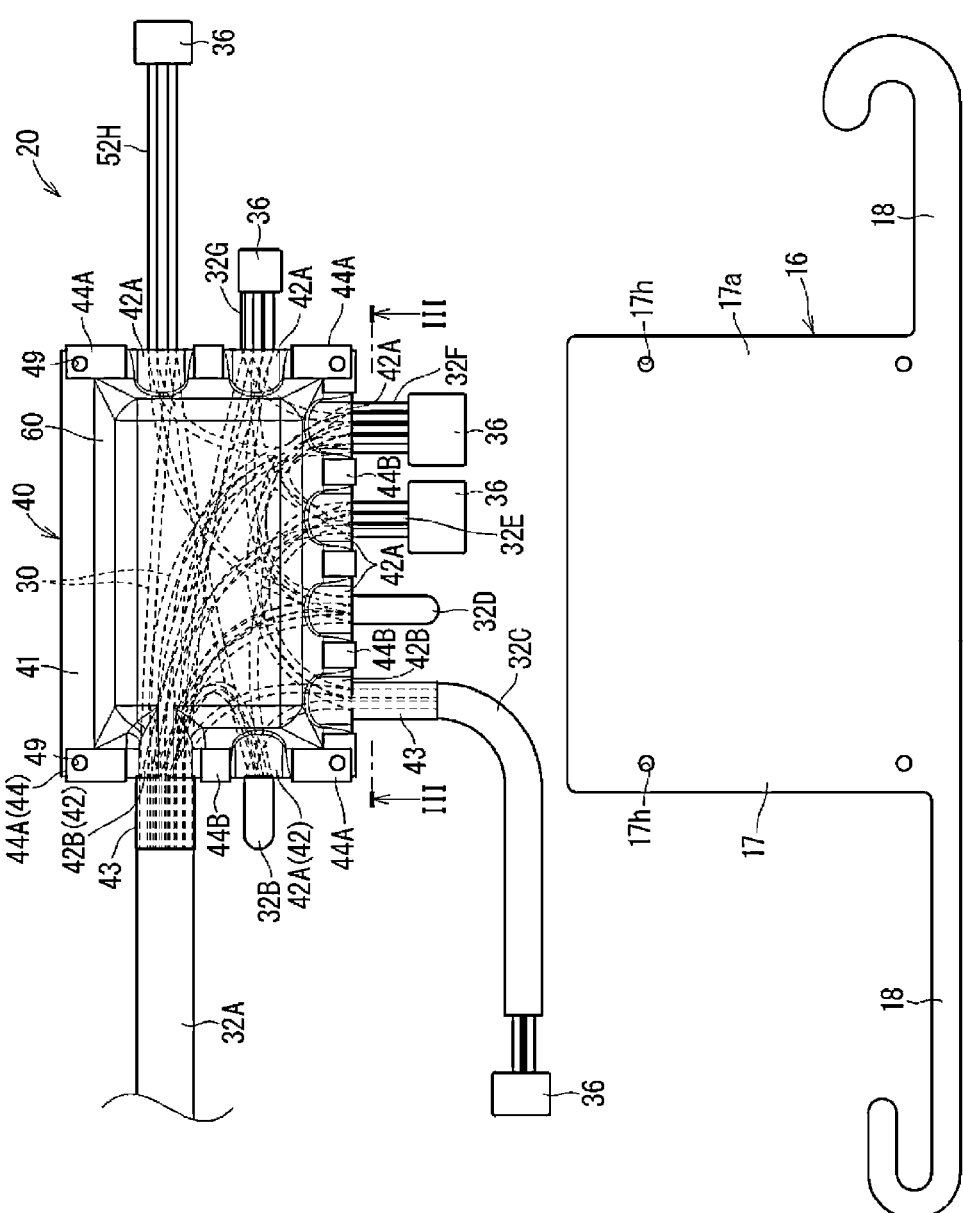
FIG. 2 is a plan view showing the wire harness and a base member to which the wire harness is to be attached.
Figure 3:
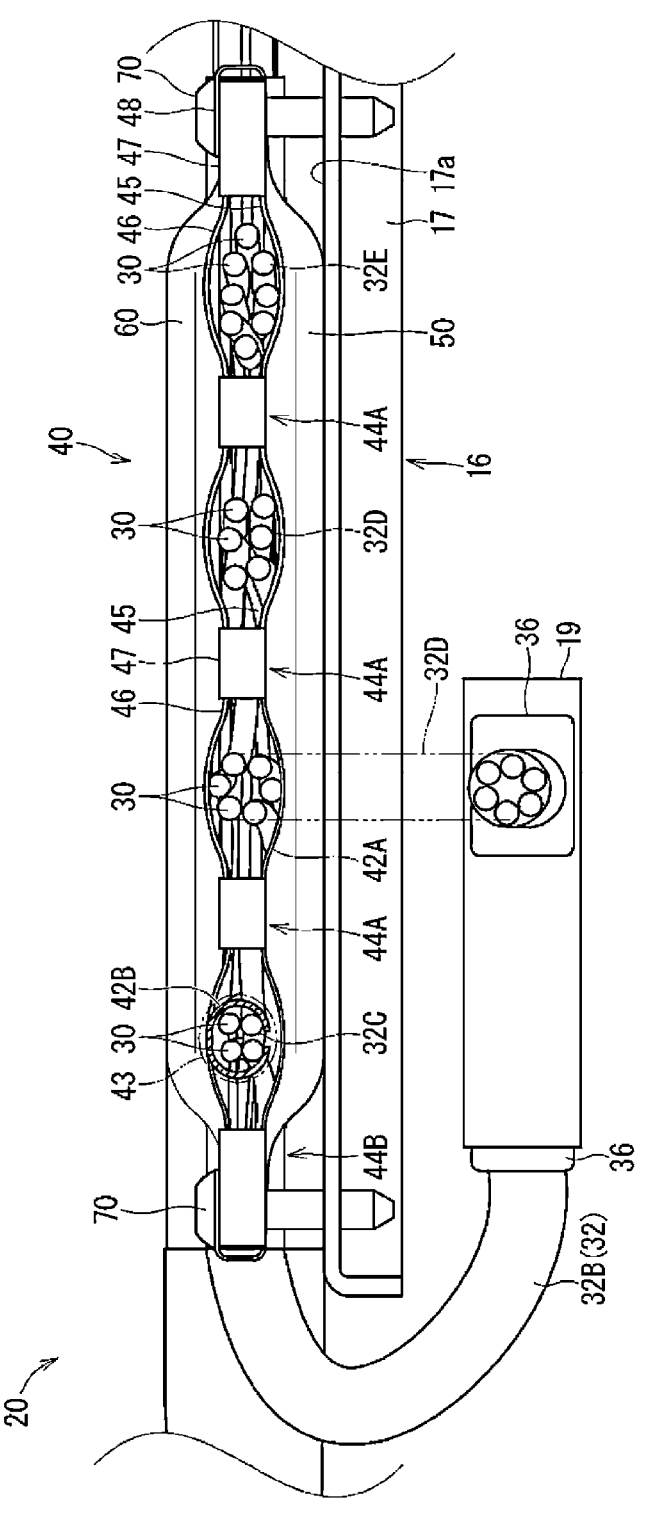
FIG. 3 is a cross-sectional view taken along line III-III in FIG. 2.

The wire harness 20 will be described with reference to FIG. 1, as well as FIGS. 2 and 3. FIG. 2 is a plan view showing the wire harness 20 and the base member 16 to which the wire harness 20 is to be attached. FIG. 3 is a cross-sectional view taken along line III-III in FIG. 2. In FIG. 3, a state is shown in which the wire harness 20 is attached to the base member 16.

The wire harness 20 is connected to the devices 19 associated with the seat 10. These devices 19 are set as appropriate depending on the vehicle type, grade, options, and the like. As examples of the devices 19, an air bag, a belt reminder, a seating sensor, an electric seat motor, a heater, a ventilator, an ECU, and the like are envisioned. The devices 19 are arranged at positions on the seat 10 according to their functions. Some of the devices 19 may also be supported by the base member 16. The wire harness 20 supplies power to these devices 19 and sends signals between these devices 19 and external devices. The wire harness 20 includes a plurality of electric wires 30 and the protective member 40.

Each electric wire 30 is a covered electric wire. A covered electric wire has a core wire and a covering that covers the core wire. Each electric wire 30 is a single-core electric wire with one conductive path. As the electric wires 30, multi-core electric wires having a plurality of conductive paths may also be used. The multi-core electric wires may also have a configuration in which a plurality of core wires are covered with a common covering. The multi-core electric wires may also have a configuration including a plurality of covered electric wires and a sheath that covers the plurality of covered electric wires. Connectors 36 may be provided at the ends of the electric wires 30. The connectors 36 may be connected to the devices 19.

The protective member 40 covers the intermediate portions of the plurality of electric wires 30. The protective member 40 includes a first sheet member 50 and a second sheet member 60. The first sheet member 50 and the second sheet member 60 sandwich the intermediate portions of the plurality of electric wires 30. In this example, the first sheet member 50 and the second sheet member 60 are formed as separate members and then are combined together. For example, each of the first sheet member 50 and the second sheet member 60 can be formed by punching out a large sheet material, or the like.

There is no particular limitation on the structures of the sheet material forming the first sheet member 50 and the sheet material forming the second sheet member 60. For example, the sheet material may also be a fibrous sheet such as a knitted fabric, a woven fabric, or a nonwoven fabric. Also, for example, the sheet material may be a foam sheet or the like. Also, for example, the sheet material may be a sheet (also called a non-foamed sheet, a solid sheet, etc.) having a uniform solid cross section. The material of the sheet material is not particularly limited and can be set as appropriate. For example, the material of the sheet material may be a resin such as a thermoplastic resin or a thermosetting resin. The type of such resin is not particularly limited, and may be polyethylene terephthalate (PET), polyvinyl chloride (PVC), polyethylene (PE), polypropylene (PP), or the like. If the first sheet member 50 and the second sheet member 60 are separate members, the first sheet member 50 and the second sheet member 60 may be made of the same material and have the same structure, or may be made of different materials and have different structures.

The plurality of electric wires 30 branch into three or more branch lines 32 inside the protective member 40. The portions where the branch lines 32 extend outside the protective member 40 at the outer edge 41 of the protective member 40 are defined as extension ports 42. Three or more extension ports 42 are provided on the outer edge 41 of the protective member 40. Fixing portions 44 are provided adjacent to the extension ports 42 on the outer edge 41 of the protective member 40. At the fixing portions 44, the first sheet member 50 and the second sheet member 60 are fixed to each other. The fixing portions 44 are provided on both sides of one extension port 42. The extension ports 42 are partitioned by the fixing portions 44. The first sheet member 50 and the second sheet member 60 sandwich the electric wires 30 at the extension ports 42. The first sheet member 50 and the second sheet member 60 may or may not be in contact with each other at the fixing portions 44.

In the example shown in FIG. 2, the plurality of electric wires 30 branch into eight branch lines 32 inside the protective member 40. The eight branch lines 32 extend out of the protective member 40 from different portions of the outer edge 41. Eight extension ports 42 are provided on the outer edge 41 of the protective member 40. Hereinafter, the eight branch lines 32 are distinguished as branch lines 32A to 32H when it is necessary to distinguish between them.

The shape of the outer edge 41 of the protective member 40 is not particularly limited, and can be set as appropriate. For example, the outer edge 41 of the protective member 40 may have a rectangular shape, a polygonal shape, a rectangular shape with a notch formed in a portion thereof, or the like. The shape of the outer edge 41 of the protective member 40 may also be a shape corresponding to the support surface 17a. In the example shown in FIG. 2, the protective member 40 is formed in a rectangular shape.

The positions of the plurality of extension ports 42 in the protective member 40 are not particularly limited, and can be set as appropriate. In the protective member 40, the extension ports 42 may be provided on all sides. In the protective member 40, there may be a side where no extension port 42 is provided.

In the example shown in FIG. 2, no extension port 42 is provided on one side (long side) of the four sides of the protective member 40. The extension ports 42 are provided on the remaining three sides (one long side and two short sides). Four extension ports 42 are provided on the long side, and two extension ports 42 are provided on each short side.

The extension ports 42 include first extension ports 42A and second extension ports 42B. At the first extension ports 42A, the branch lines 32 and the protective member 40 are not fixed to each other. At the first extension ports 42A, the branch lines 32 are provided so as to be movable in and out of the protective member 40. At the second extension ports 42B, the branch lines 32 and the protective member 40 are fixed to each other. At the second extension ports 42B, the branch lines 32 and the protective member 40 are wrapped with tape. A wrapping piece is provided on at least one of the first sheet member 50 and the second sheet member 60 at each second extension port 42B. By wrapping the wrapping piece around the branch line 32 and further wrapping adhesive tape 43 around it, the wrapping piece is kept in a wrapped state around the branch line 32.

In the example shown in FIG. 2, the extension ports 42 from which the branch lines 32B and 32D to 32H extend are the first extension ports 42A, and the extension ports 42 from which the branch lines 32A and 32C extend are the second extension ports 42B. Whether an extension port 42 is a first extension port 42A or a second extension port 42B is not particularly limited and can be set as appropriate. For example, whether an extension port 42 is a first extension port 42A or a second extension port 42B may also be set as follows.

That is, among the three or more branch lines 32, the branch line 32 having the shortest length from the protective member 40 to a terminal portion is the shortest line. Also, among the three or more branch lines 32, the branch line 32 having the longest length from the protective member 40 to a terminal portion is the longest line. The extension port 42 of the shortest line may be the first extension port 42A, and the extension port 42 of the longest line may be the second extension port 42B. In the example shown in FIG. 2, among the eight branch lines 32, the branch lines 32E, 32F, and 32G are the shortest lines, and the branch line 32A is the longest line. The extension ports 42 of the branch lines 32E, 32F, and 32G are the first extension ports 42A, and the extension port 42 of the branch line 32A is the second extension port 42B. Note that the length from the protective member 40 of the branch line 32 extending from the first extension port 42A to the terminal portion may be the length from the protective member 40 to the terminal portion when the branch line 32 is drawn out to the maximum extent.

The extension ports 42 for the branch lines 32 other than the shortest line and the longest line may also be set according to the length from the protective member 40 to the terminal portion. In the example shown in FIG. 2, the extension ports 42 of the branch lines 32B, 32D, and 32H, which have short lengths from the protective member 40 to the terminal portions, are the first extension ports 42A. Also, the extension port 42 of the branch line 32C having a long length from the protective member 40 to the terminal portion is the second extension port 42B.

Note that an adhesive tape may be spirally wrapped around the branch line 32 between the extension port 42 and the terminal portion. Adhesive tape that is continuous with the adhesive tape 43 forming the second extension port 42B may be spirally wrapped toward the terminal portion of the branch line 32. An adhesive tape different from the adhesive tape 43 forming the second extension port 42B may also be spirally wrapped between the extension port 42 and the terminal portion of the branch line 32.

The fixing portions 44 include folded fixing portions 44. The folded fixing portions 44 are portions where one of the first sheet member 50 and the second sheet member 60 is folded back and fixed so as to overlap with the outer surface of the other sheet member. The fixing mode of the first sheet member 50 and the second sheet member 60 in the folded fixing portion 44 is not particularly limited, and adhesion, fusion, or the like may be set as appropriate. Such a fixing mode is preferably one in which the first sheet member 50 and the second sheet member 60 do not need to be strongly pressed from both sides, and for example, adhesion using an adhesive, double-sided adhesive tape, or the like is preferable. As a result, even if the first sheet member 50 and second sheet member 60 are pressed from both sides with the electric wires 30 caught between them, the electric wires 30 are less likely to be damaged.

Among the folded fixing portions 44, the folded fixing portions 44 in which the first sheet member 50 is folded back and overlaps with the outer surface of the second sheet member 60 are the first folded fixing portions 44. Among the folded fixing portions 44, the folded fixing portions 44 in which the second sheet member 60 is folded back and overlaps with the outer surface of the first sheet member 50 are second folded fixing portions. In the example shown in FIG. 2, all of the folded fixing portions 44 are the first folded fixing portions 44. As the folded fixing portions 44, only the first folded fixing portions 44 are provided.

In the folded fixing portions 44, the first sheet member 50 and the second sheet member 60 overlap in three or more layers. In the example shown in FIG. 2, the folded fixing portions 44 in which the first sheet member 50 and the second sheet member 60 overlap in three layers and the folded fixing portions 44 in which the first sheet member 50 and the second sheet member 60 overlap in four layers are provided as the folded fixing portions 44. The first sheet member 50 and the second sheet member 60 overlap in three layers at the folded fixing portions 44A located in the middle of the sides. The first sheet member 50 and the second sheet member 60 overlap in four layers in the folded fixing portions 44B located at the four corners of the protective member 40.

In the folded fixing portions 44A, three layers 45, 46, and 47 are overlapped in this order. Two layers 45 and 47 among the three layers 45, 46, and 47 are the first sheet members 50. The layer 45 is a portion of the first sheet member 50 that forms the main body of the protective member 40, and the layer 47 is the portion of the first sheet member 50 that is folded back. The remaining one layer 46 among the three layers 45, 46, and 47 is the second sheet member 60. The one layer 46 of the second sheet member 60 is located between the two layers 45 and 47 of the first sheet member 50. The layer 46 and the layer 47 are fixed by an adhesive or the like provided therebetween. The layer 45 and the layer 46 may or may not be in contact with each other. The layer 45 and the layer 46 may or may not be fixed to each other.

In the folded fixing section 44B, another layer 48 further overlaps the three layers 45, 46, and 47. The layer 48 is the first sheet member 50. The layer 48 is a portion of the first sheet member 50 in which a portion that is different from the layer 47 is folded back. The layer 48 overlaps the layer 47. The layer 47 and the layer 48 are fixed by an adhesive or the like provided therebetween.

Through holes 49 for fixing the protective member 40 to the base member 16 are formed in the protective member 40. The through holes 49 are formed at positions corresponding to the attachment holes 17h. The protective member 40 is formed in a shape that allows the through holes 49 to be placed at positions corresponding to the attachment holes 17h.

The through holes 49 are formed at positions where the first sheet member 50 and the second sheet member 60 overlap. The through holes 49 pass through both the first sheet member 50 and the second sheet member 60. This strengthens the through holes 49. Even if the protective member 40 is pulled when fixing one of the plurality of through holes 49 and then fixing another, the periphery of the through hole 49 is less likely to be torn.

The through holes 49 are preferably provided in the fixing portions 44. This prevents the first sheet member 50 and the second sheet member 60 from moving apart from each other at the positions of the through holes 49, and thus it is easier to insert pins 70 or the like into the through holes 49.

The through holes 49 are preferably provided in the folded fixing portions 44. It is preferable that the folded fixing portions 44 are provided at the positions where the through holes 49 are formed. As a result, the first sheet member 50 and the second sheet member 60 overlap in three or more layers at the positions of the through holes 49, and the through holes 49 are further strengthened. In this example, the through holes 49 are provided in the folded fixing portions 44B. As a result, the first sheet member 50 and the second sheet member 60 overlap in four layers at the positions of the through holes 49, and the through holes 49 are further strengthened.

It is preferable that holes corresponding to the through holes 49 are formed in the first sheet member 50 and the second sheet member 60 before being fixed to each other. As a result, the holes corresponding to the through holes 49 can also be used as holes through which jigs are passed when manufacturing the wire harness 20.

The protective member 40 is flat. The space below the seat portion 11 is narrow in the height direction. Since the protective member 40 is flat, the protective member 40 can be easily accommodated in the space below the seat portion 11.

In a region inside the outer edge 41 of the protective member 40, the first sheet member 50 and the second sheet member 60 are not fixed to each other and are in a free state. The inner surface of the first sheet member 50 facing toward the electric wires 30 and the inner surface of the second sheet member 60 facing toward the electric wires 30 are not fixed to each other and are in a free state.

In a region inside the outer edge 41 of the protective member 40, the plurality of electric wires 30 are not bundled together and extend apart from each other. Also, in a region inside the outer edge 41 of the protective member 40, the plurality of electric wires 30 are not fixed to the first sheet member 50 and the second sheet member 60, and extend along free paths. In a region inside the outer edge 41 of the protective member 40, each electric wire 30 is not restrained by any of the other electric wires 30, the first sheet member 50, and the second sheet member 60.

One end of an electric wire 30 extends out from one extension port 42, and the other end extends out from another extension port 42. The electric wires 30 extend between two predetermined extension ports 42 for each electric wire 30 inside the protective member 40. The electric wires 30 extend between the two extension ports 42 along paths longer than the shortest path. The shortest path is a path along a straight line connecting the two extension ports 42. The electric wires 30 extend in a curved manner between the two extension ports 42. As a result, the extra lengths of the electric wires can be stored inside the protective member 40.

The branch lines 32 may further branch outside the protective member 40. In this disclosure, the electric wires 30 that branch from the branch lines 32 outside the protective member 40 are referred to as branch lines 34. As shown in FIG. 1, a branch line 32A branches into four branch lines 34 outside the protective member 40. A connector 36 is provided at the end of each of the eight branch lines 32. Regarding the branch line 32A, a connector 36 is provided at each end of the four branch lines 34. One connector 36 is provided for each of the seven branch lines 32B to 32D. Accordingly, in this example, eight branch lines 32 and eleven connectors 36 are provided.

The greater the number of branch lines 32 extending out from the protective member 40, the more branch portions are housed inside the protective member 40. That is, as the number of branch lines 32 extending out from the protective member 40 increases, the shapes of more branch portions can be collectively maintained by the protective member 40. The number of branch portions for which the branching shape needs to be maintained individually is reduced, there is no need to create branch portions by wrapping with tape or the like, and thus it is easier to manufacture the wire harness 20. Also, when routing the wire harness 20, there is no need to bend the wire harness 20 at a branch portion.

For example, the number of branch lines 32 extending from the protective member 40 is preferably 30% or more, more preferably 50% or more, and more preferably 70% or more of the total number of connectors 36 in the wire harness 20. The connectors 36 in the wire harness 20 are connectors 36 provided at the ends of the branch lines 32. If the branch lines 32 further branch into branch lines 34, the connectors 36 in the wire harness 20 include connectors 36 provided at the ends of the branch lines 34. The connectors 36 in the wire harness 20 do not include the connector of another wire harness connected via the connectors 36.

<Manufacturing Method>

FIGS. 4 to 7 are explanatory diagrams showing how the wire harness 20 is manufactured. Note that FIGS. 4 to 7 are all plan views.

Figure 4:
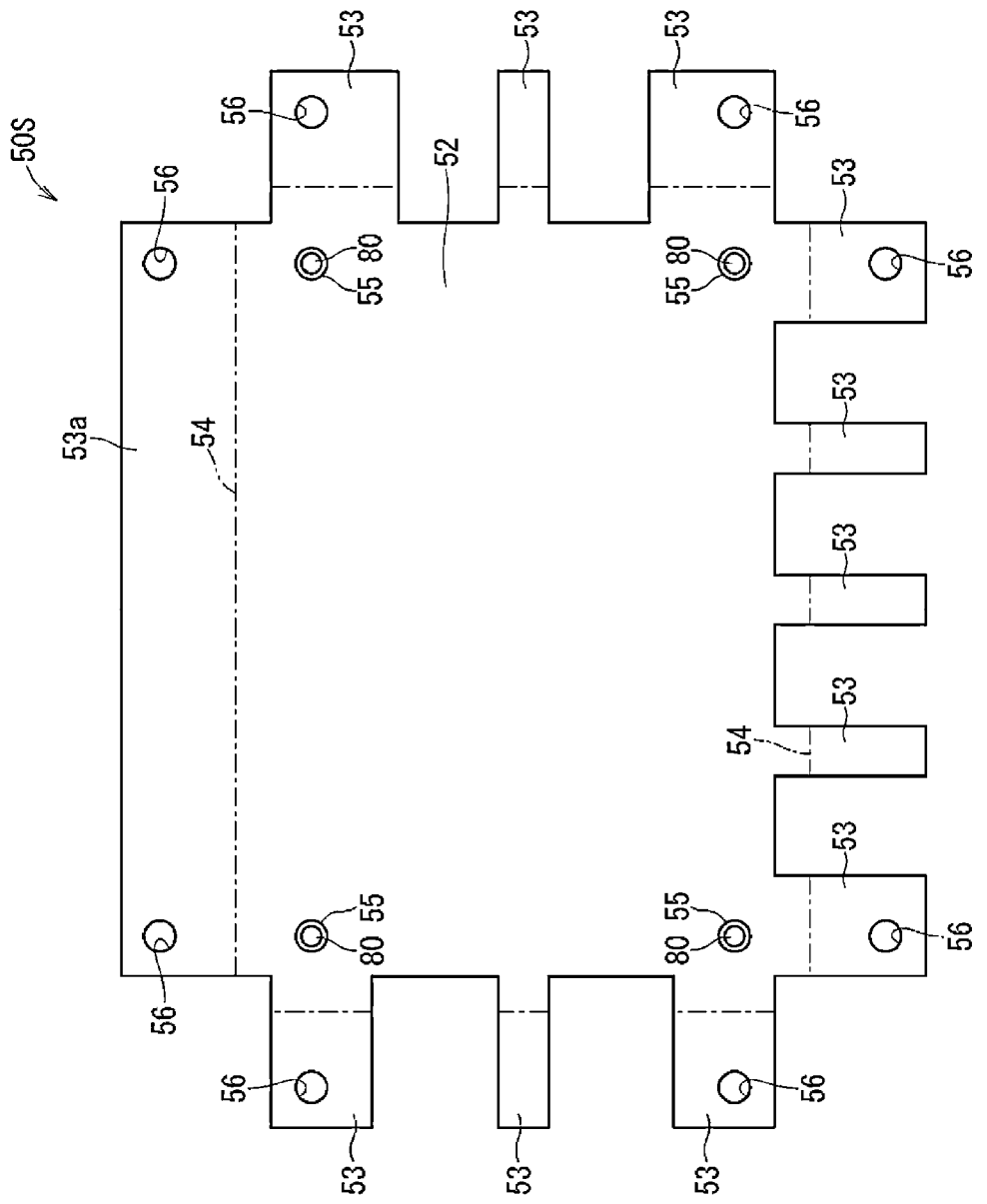
FIG. 4 is an explanatory diagram showing how the wire harness is manufactured.

First, the first sheet member 50 and the second sheet member 60 that have not yet been combined with each other are prepared. Hereinafter, the first sheet member 50 and the second sheet member 60 that have not yet been combined with each other are denoted by reference signs S in some cases. FIG. 4 shows a first sheet member 50S that has not yet been combined with the second sheet member 60. The first sheet member 50S is formed into a flat sheet shape. The first sheet member 50S has a first main body portion 52 and a plurality of first protruding portions 53. The first main body portion 52 is a portion forming the main body of the protective member 40. Each first protruding portion 53 protrudes outward from the outer edge of the first main body portion 52. Each first protruding portion 53 is a portion that is to be a folded fixing portion 44. Four first through holes 55 are formed in the first main body portion 52. A first through hole 56 is also formed in each first protruding portion 53. The first through holes 55 of the first main body portion 52 and the first through holes 56 of the first protruding portion 53 overlap with each other when the first protruding portions 53 are folded back with predetermined folds 54. In FIG. 4, the fold 54 in each first protruding portion 53 is indicated by a dashed dotted line.

A first protruding portion 53a is provided over the entirety of one long side of the first main body portion 52. The first protruding portion 53a closes the entire opening on the long side of the protective member 40 where no extension port 42 is provided. First through holes 56 are formed at both ends of the first protruding portion 53a along the direction in which the long sides extend. Both ends of the first protruding portion 53a along the direction in which the long sides extend are folded fixing portions 44B, and the intermediate portion therebetween is a folded fixing portion 44A.

This first sheet member 50S is held by jigs 80, as shown in FIG. 4. By inserting pin-shaped jigs 80 into the four first through holes 55 of the first main body portion 52, the first sheet member 50S is held by the jigs 80.

Figure 5:
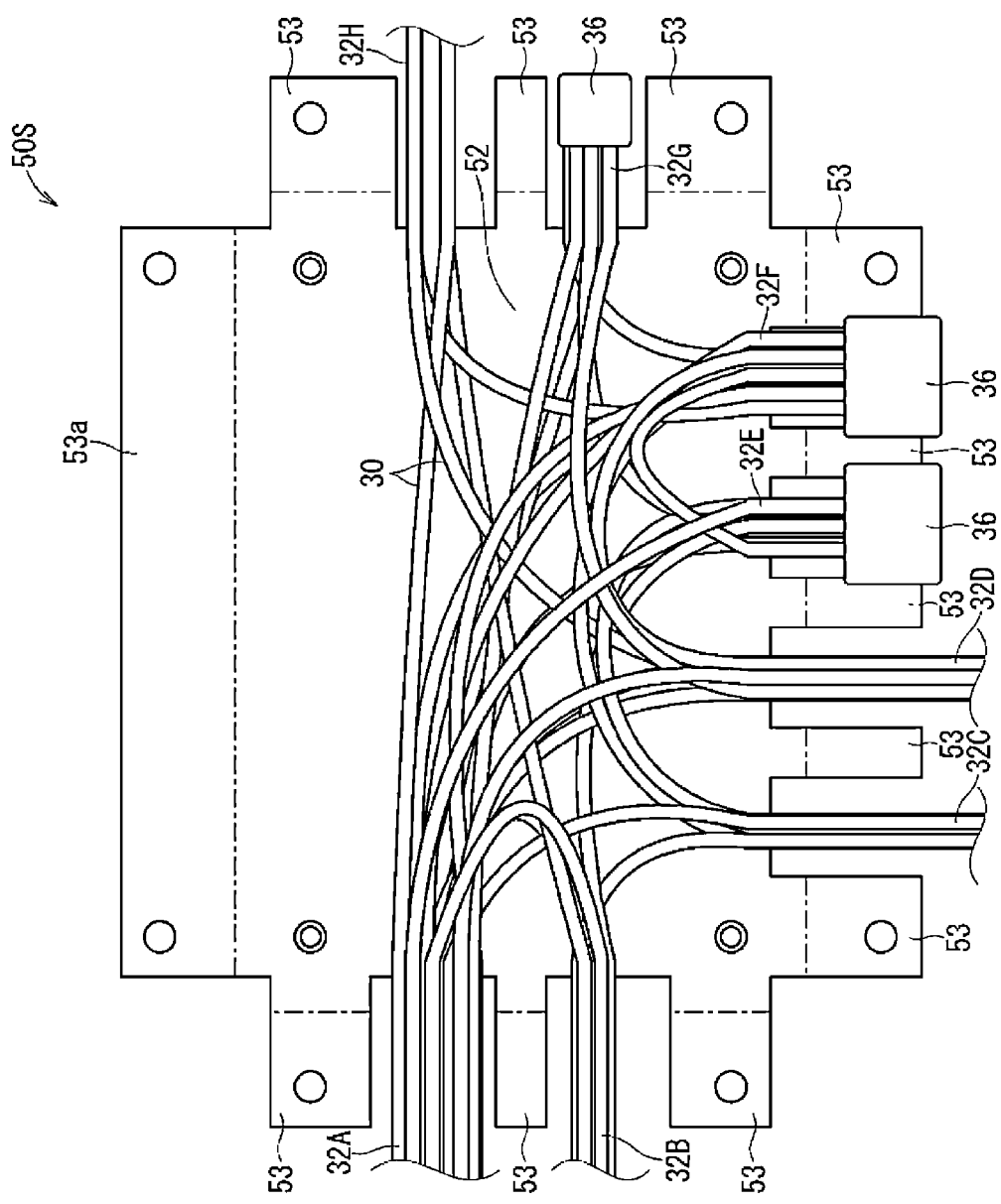
FIG. 5 is an explanatory diagram showing how the wire harness is manufactured.

Next, as shown in FIG. 5, the intermediate portions of the plurality of electric wires 30 are arranged on the first sheet member 50. At this time, by arranging the plurality of electric wires 30 according to a predetermined wiring mode, the plurality of branch lines 32 extend from predetermined positions on the outer edge of the first main body portion 52 (here, between the first protruding portions 53). For example, by holding the connectors 36 at the ends of the plurality of electric wires 30 at predetermined positions, the plurality of electric wires 30 can be arranged according to a predetermined wiring mode. At this time, the lengths of the jigs and the connectors 36 may be set to be predetermined lengths. As a result, even if extra lengths are generated in the branch lines 32 due to manufacturing tolerances or the like, the extra lengths can be located above the first main body portion 52.

Figure 6:
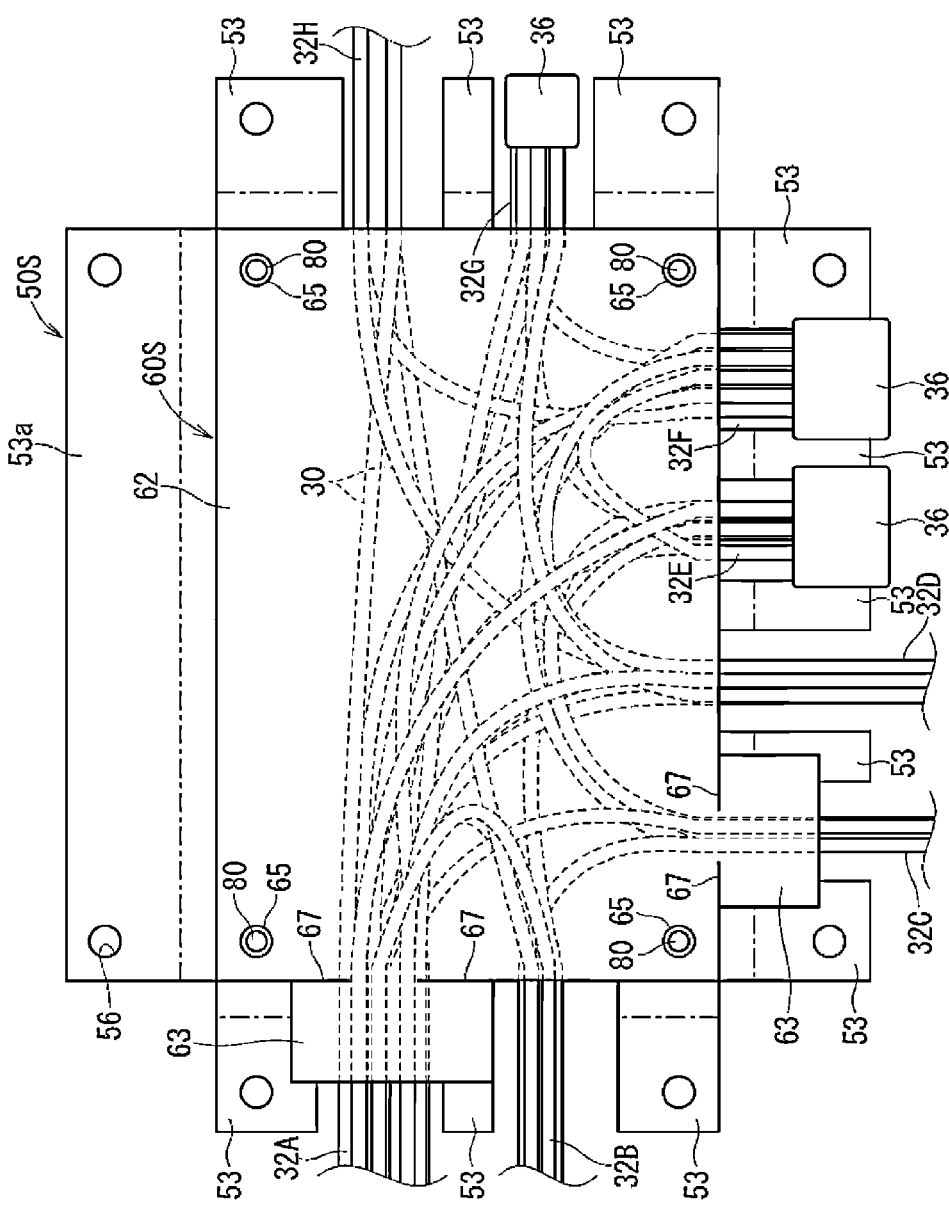
FIG. 6 is an explanatory diagram showing how the wire harness is manufactured.

Next, as shown in FIG. 6, a second sheet member 60S is overlaid on the first sheet member 50S and the electric wire 30. FIG. 6 shows the second sheet member 60S that has not yet been combined with the first sheet member 50S. The second sheet member 60S has a second main body portion 62 and a plurality of second protruding portions 63. The second main body portion 62 is a portion forming the main body of the protective member 40. The second main body portion 62 is formed in a shape corresponding to the first main body portion 52. The second protruding portions 63 protrude outward from the outer edge of the second main body portion 62. The second protruding portions 63 are portions that are wrapped around the branch lines 32 with tape to form the second extension ports 42B. Four second through holes 65 are formed in the second main body portion 62. Slits 67 are formed between the second protruding portions 63 and the second main body portion 62. The slits 67 extend along the outer edge of the second main body portion 62. The slits 67 extend toward the center from both sides of the second protruding portions 63. The provision of the slits 67 makes it easier for the second protruding portions 63 to be wrapped around the branch lines 32. By inserting the pin-shaped jigs 80 into the four second through holes 65 of the second main body portion 62 of the second sheet member 60S, a state is maintained in which the second sheet member 60S is held by the jigs 80 and is arranged on the first sheet member 50S and the electrical wire 30.

Figure 7:
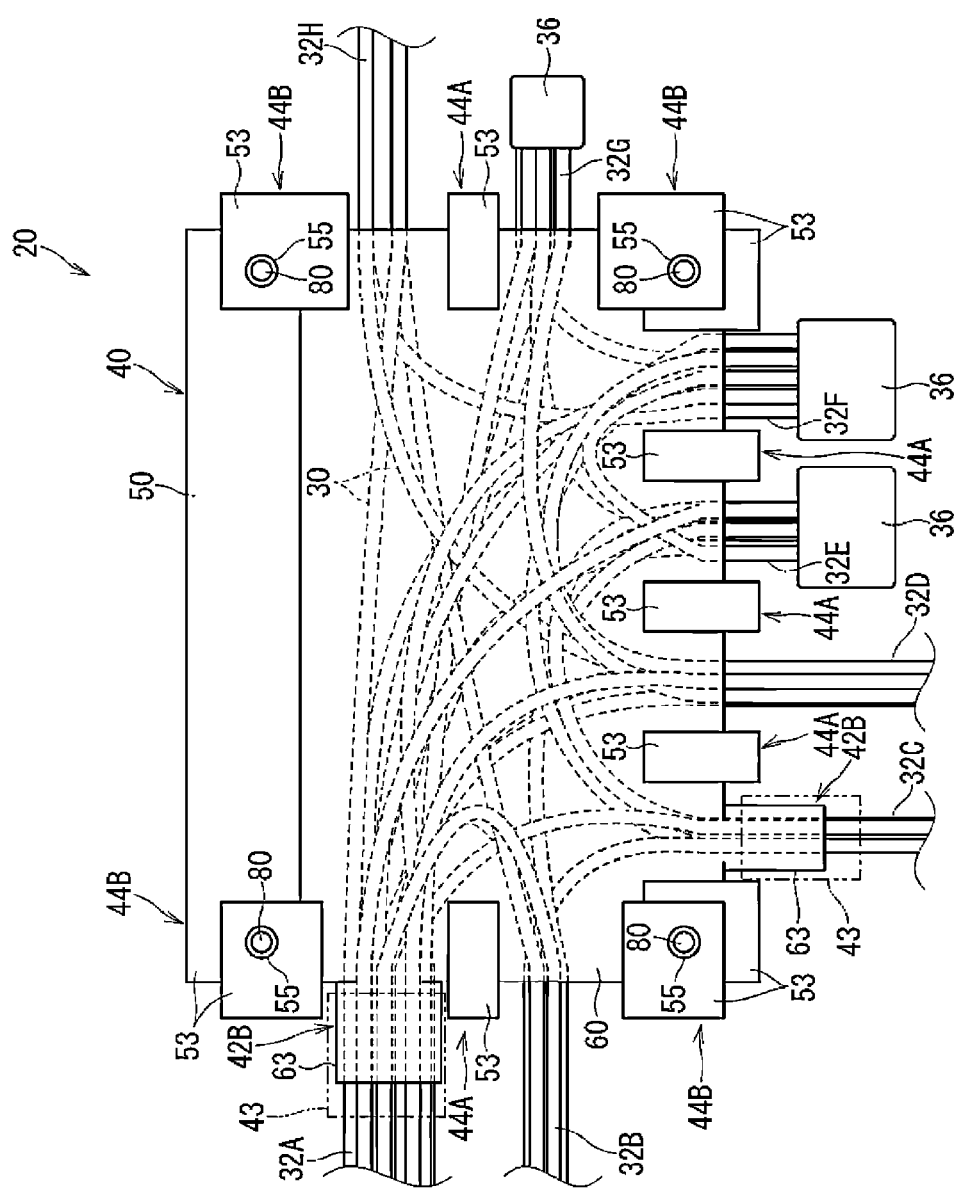
FIG. 7 is an explanatory diagram showing how the wire harness is manufactured.

Next, as shown in FIG. 7, the first protruding portions 53 are folded back to be overlaid on the outer surface of the second sheet member 60. For the first protruding portions 53 in which the first through holes 55 are formed, the jigs 80 are inserted into the first through holes 55. Then, the first protruding portions 53 and the second sheet member 60 are fixed with adhesive or the like. As a result, the folded fixing portions 44A are formed. In the folded fixing sections 44B overlaid in four layers, other first protruding portions 53 are further overlaid with the outer surfaces of the first protruding portions 53 and are fixed with an adhesive or the like. By forming the folded fixing portions 44, the extension ports 42 are formed between the folded fixing portions 44. In particular, by forming two folded fixing portions 44, a first extension port 42A is created in the portion therebetween.

In the folded fixing parts 44A and 44B, the layer 45 is the first main body portion 52, the layer 46 is the second main body portion 62, and the layer 47 is the first protruding portion 53. The layer 48 in the folded fixing portion 44B is a first protruding portion 53 different from the first protruding portion 53 forming the layer 47. Note that in the folded fixing portion 44B overlaid in four layers, the first protruding portion 53 on the long side is overlaid on the outer surface of the second sheet member 60, and the first protruding portion 53 on the short side is further overlaid thereon, but the positions may also be reversed.

Also, as shown in FIG. 7, the second protruding portions 63 are wrapped around the branch lines 32, and adhesive tape is further wrapped around the second protruding portions 63 to fix them. As a result, the second extension ports 42B are formed. Note that either the folded fixing portions 44 or the second extension ports 42B may be formed first.

It is preferable that the first sheet member 50 and the second sheet member 60 have enough flexibility to bend along the branch lines 32 toward the fixing portions 44 adjacent thereto while sandwiching the electric wires 30 at the extension ports 42. As a result, the extension ports 42 become smaller and the branch lines 32 becomes less likely to move unintendedly. Also, a three-dimensional protective member 40 corresponding to the electric wires 30 can be formed using the flat first sheet member 50S and the second sheet member 60S.

When the jigs 80 are removed, the holes into which the jigs were inserted appear as the through holes 49 in the protective member 40. As described above, the protective member 40 is attached to the plurality of electric wires 30, and the wire harness 20 is manufactured.

<Method for Attaching Base Member>

Figure 8:
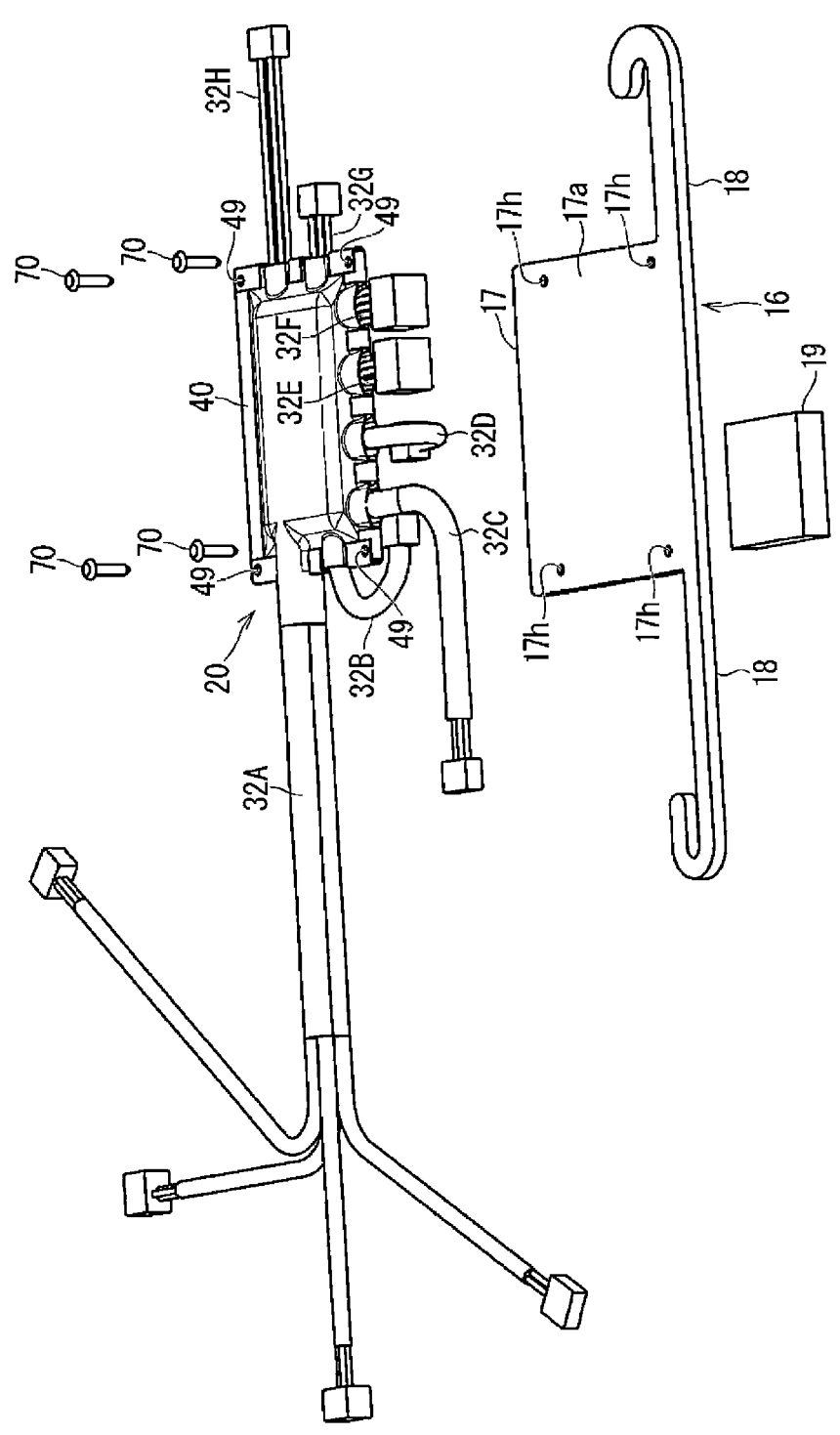
FIG. 8 is an explanatory diagram showing how the wire harness is attached to the base member.

FIG. 8 is an explanatory diagram showing how the wire harness 20 is attached to the base member 16.

In this example, the wire harness 20 is attached to the base member 16 using pins 70. The protective member 40 is placed on a support surface 17a of the base member 16. The pins 70 pass through the through holes 49 of the protective member 40 and lock into the attachment holes 17h of the base member 16. At this time, the devices 19 may be attached to the base member 16, and the connectors 36 at the ends of the branch lines 32 may be connected to the devices 19. In the example shown in FIG. 8, the devices 19 are provided on the surface of the base member 16 opposite to the support surface 17a. The connectors 36 of the branch lines 32B and 32D are then connected to the devices 19.

Note that the attached portions of the base member 16 does not need to be the attachment holes 17h, and may be, for example, stud bolts or the like. In this case, the wire harness 20 is attached to the base member 16 by passing the stud bolts through the through holes 49 of the protective member 40.

When the attachment to the base member 16 is complete, the protective member 40 of the wire harness 20 is attached at a predetermined position. Thereafter, the branch lines 32 extending from the protective member 40 are routed to the position of the connection partner, thereby completing the routing of the wire harness 20.

<Wire Harness with Base Member>

Figure 9:
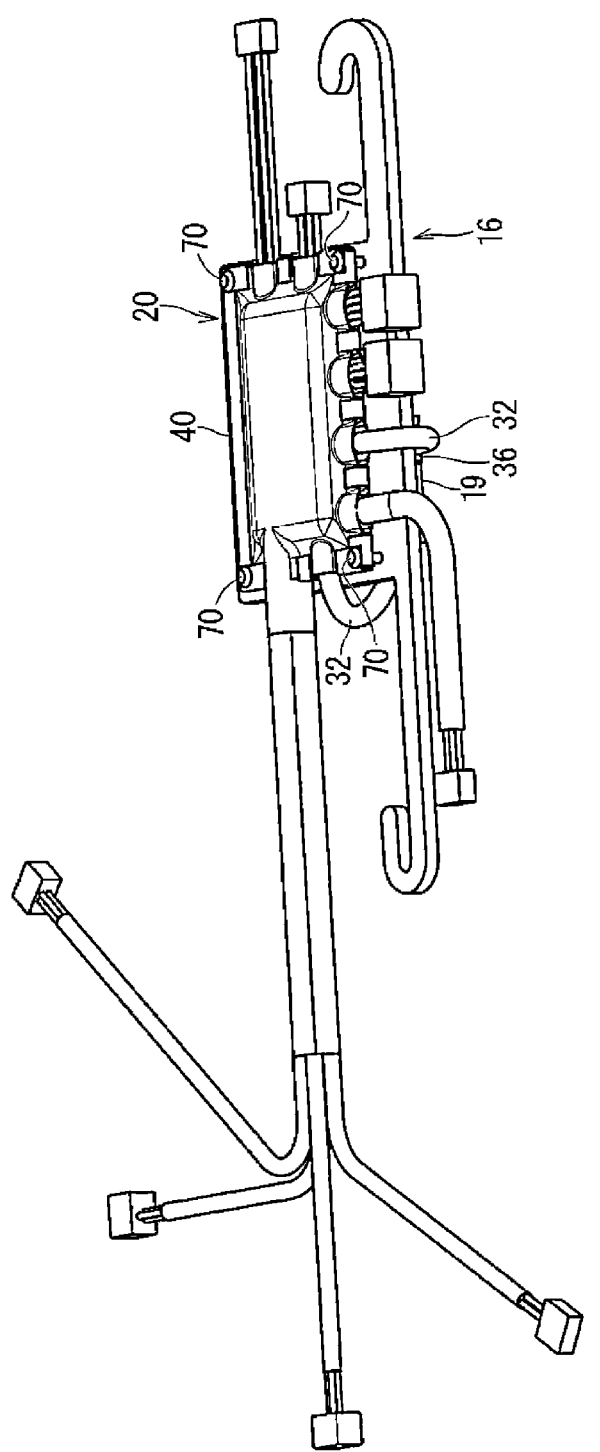
FIG. 9 is a perspective view showing the wire harness with the base member.

FIG. 9 is a perspective view showing the wire harness 20 with the base member 16.

In the example shown in FIG. 1, the wire harness 20 is shown attached to the base member 16 provided on the seat 10. The wire harness 20 may also be attached to the base member 16 before being installed on the seat 10. In this case, as shown in FIG. 9, the wire harness 20 with base member 16 includes the wire harness 20 and the base member 16. By attaching the base member 16 of the wire harness 20 with the base member 16 to the seat 10, the step of attaching the base member 16 to the seat 10 and the step of attaching the wire harness 20 can be performed in a common step. The wire harness 20 with the base member 16 may further include the devices 19 attached to the base member 16, and the connectors 36 of the branch lines 32 may be connected to the devices 19.

<Effects>

According to the wire harness 20 configured as described above and the wire harness 20 with the base member 16 including the same, the intermediate portions including the branch portions of the plurality of electric wires 30 are collectively protected by the protective member 40. This simplifies manufacturing of the wire harness 20 that is to be attached to the seat 10 of the vehicle. Also, when the portion of the wire harness 20 where the protective member 40 is provided is installed on the base member 16 of the seat 10, the intermediate portions of the plurality of electric wires 30 where the protective member 40 is installed are arranged along predetermined paths, and each branch line 32 extends out from a predetermined extension port 42. This simplifies the routing of the wire harness 20 to be attached to the seat 10 of the vehicle.

Also, the fixing portions 44 include the folded fixing portions 44 in which one of the first sheet member 50 and the second sheet member 60 is folded back and fixed so as to overlap with the outer surface of the other sheet member. This prevents the electric wires 30 from being caught when the fixing portions 44 are provided. Even if a large number of the extension ports 42 are provided, the outer edge 41 of the protective member 40 can be reliably fixed. In this example, only the first folded fixing portions 44, which overlap with the outer surface of the second sheet member 60 by folding back the first sheet member 50, are provided as the folded fixing portions 44. This simplifies the formation of the folded fixing portions 44.

Also, the through holes 49 for fixing the protective member 40 to the base member 16 are formed in the protective member 40. As a result, the protective member 40 can be easily fixed to the base member 16 using the through holes 49. In this example, these through holes 49 are formed at positions where the first sheet member 50 and the second sheet member 60 overlap. This increases the strength of the through holes 49.

Also, the extension ports 42 include the first extension ports 42A in which the branch lines 32 are provided so as to be movable in and out of the protective member 40. As a result, in the first extension ports 42A, the branch lines 32 can be drawn out from the protective member 40 and connected when connecting the connectors.

Also, the extension ports 42 include the second extension ports 42B in which the branch lines 32 and the protective member 40 are wrapped with tape. This determines the length from the protective member 40 to the ends of the branch lines 32 at the second extension ports 42B.

In addition, the length from the protective member 40 to the ends of the branch lines 32 at the first extension ports 42A when the branch lines 32 are drawn out to the maximum limit is shorter than the length from the protective member 40 to the ends of the branch lines 32 at the second extension ports 42B. As a result, the short branch lines 32 can be drawn out from the protective member 40 and connected when connecting the connectors, making it easier to connect the connectors. Also, the long branch lines 32 are prevented from being caught on surrounding members and unnecessarily drawn out from the protective member 40 during transport or the like.

Also, according to the wire harness 20 with the base member 16, since the protective member 40 is attached to the base member 16, the intermediate portion of the wire harness 20 can be arranged along a predetermined path on the seat 10 by attaching the base member 16 to the seat 10.

[Supplementary Notes]

Figure 10:
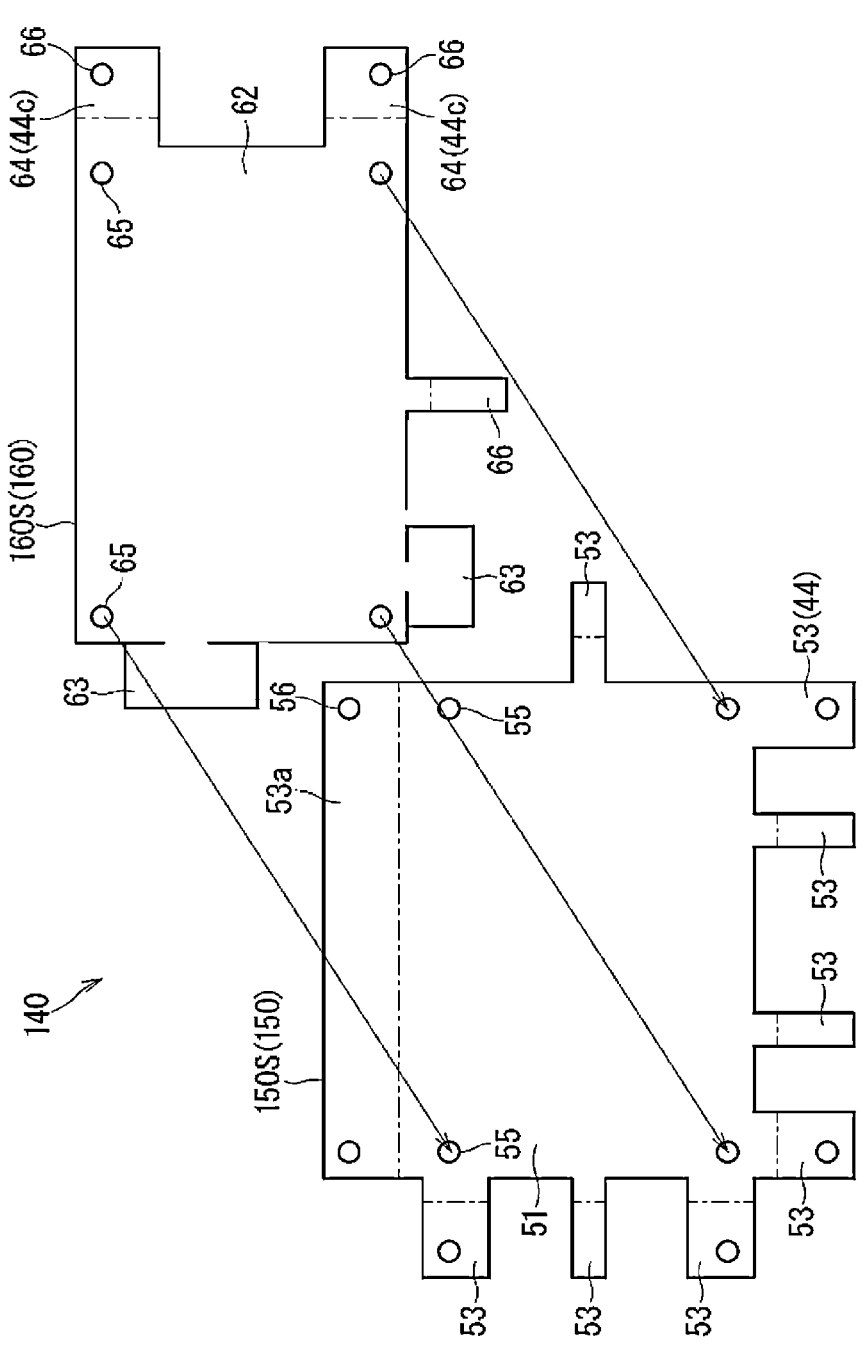
FIG. 10 is a plan view showing a modified example of a protective member.

FIG. 10 is a plan view showing a modified example of the protective member 40. FIG. 10 shows a first sheet member 150S and a second sheet member 160S that constitute a protective member 140 according to the modified example.

Although the protective member 40 has been described thus far as having only the first folded fixing portions 44 as the folded fixing portions 44, this is not an essential configuration. As with the protective member 140 shown in FIG. 10, both the first folded fixing portions 44 and second folded fixing portions 44C may be provided. As a result, both the first sheet member 150 and the second sheet member 160 are folded back, whereby the fixing portions 44 are easily kept in a fixed state.

In the example shown in FIG. 10, some of the first protruding portions 53 of the first sheet member 50S are omitted in the first sheet member 150S. In place of the omitted first protruding portions 53, second protruding portions 64 are provided on the second sheet member 160S. The second protruding portions 64 are folded back to overlap with the outer surface of the first sheet member 50, and are fixed with an adhesive or the like. As a result, the second folded fixing portions 44C are formed. Note that although the second protruding portion 63 in which a second through hole 66 is formed and the second protruding portion 63 in which no second through hole 66 is formed are provided, one of them may not be provided.

In addition, although the fixing portions 44 have been described thus far as including the folded fixing portions 44, this is not an essential configuration. The fixing portions do not need to include the folded fixing portions 44. In this case, the fixing portions may include a fixing portion other than the folded fixing portions 44. For example, the fixing portions may include a fixing portion in which the inner surface of the first sheet member 50 facing toward the electric wire 30 and the inner surface of the second sheet member 60 facing toward the electric wire 30 are adhered to each other.

Also, in the above description, in the case where the fixing portions include the folded fixing portions 44, it is not an essential configuration that the fixing portions include only the folded fixing portions 44. The fixing portions may include both the folded fixing portions 44 and a fixing portion other than the folded fixing portions 44.

Also, although the through holes 49 have been described thus far as being formed in the protective member 40, this is not an essential configuration. The through holes 49 need not be formed in the protective member 40. In this case, the protective member 40 may be fixed to the base member 16 by a configuration other than fastening with the pins 70. For example, the protective member 40 may be adhered to the support surface 17a with an adhesive, double-sided adhesive tape, or the like.

Also, the through holes 49 have been described thus far as being formed at positions where the first sheet member 50 and the second sheet member 60 overlap when the through holes 49 are formed in the protective member 40, but this is not an essential configuration. The through holes 49 may be formed in the protective member 40 at positions where either the first sheet member 50 or the second sheet member 60 is present alone. For example, the protective member 40 may be attached using the first through holes 55 without some of the first protruding portions 53 being folded back.

Also, although the wire harness 20 has been described thus far as having both the first extension ports 42A and the second extension ports 42B, this is not an essential configuration. The wire harness 20 may have only one of the first extension ports 42A and the second extension ports 42B.

Also, in the above description, when the wire harness 20 has both the first extension ports 42A and the second extension ports 42B, the first extension ports 42A are applied to the short branch lines 32, and the second extension ports 42B are applied to the long branch lines 32, but this is not an essential configuration. For example, the second extension ports 42B may also be applied to the short branch lines 32. Also, for example, the first extension ports 42A may be applied to the long branch lines 32.

Also, although the first sheet member 50 and the second sheet member 60 have been described thus far as being separate members from each other, this is not an essential configuration. The first sheet member 50 and the second sheet member 60 may be molded so that they are partially connected, and the connected portion may be folded back to form the protective member 40. When the protective member 40 is separated into the first sheet member 50 and the second sheet member 60, a portion of the first sheet member 50 and the second sheet member may be connected without any trace of fusion, adhesion, or the like. For example, the first sheet member 50 and the second sheet member 60 may be connected on the long side of the protective member 40 where no extension port 42 is provided.

Note that the configurations described in each of the above embodiments and modified examples can be appropriately combined as long as they do not contradict each other.

LIST OF REFERENCE NUMERALS

10 Seat
11 Seat portion
12 Backrest portion
13 Frame
14 Rail
15 Slider
16 Base member
17 Main body portion
17*a* Support surface
17*h* Attachment hole
18 Arm portion
19 Device
20 Wire harness
30 Electric wire
32, 32A to 32H Branch line
34 Support wire
36 Connector
40 Protective member
41 Outer edge
42 Extension port
42A First extension port
42B Second extension port
43 Adhesive tape
44, 44A, 44B First folded fixing portion (folded fixing portion, fixing portion)
44C Second folded fixing portion (folded fixing portion, fixing portion)
45, 46, 47, 48 Layer
49 Through hole
50, 50S, 150S First sheet member
52 First main body portion
53, 53*a* First protruding portion
54 Fold
55, 56 First through hole
60, 60S, 160S Second sheet member
62 Second main body portion
63, 64 Second protruding portion
65, 66 Second through hole
67 Slit
70 Pin
80 Jig

What is claimed is:

1. A wire harness to be attached to a seat of a vehicle, comprising:
   a plurality of electric wires; and
   a protective portion covering intermediate portions of the plurality of electric wires, wherein the plurality of electric wires branch into three or more branch lines inside of the protective portion,
   the protective portion includes a first sheet and a second sheet sandwiching the intermediate portions of the plurality of electric wires,
   an outer edge of the protective portion is provided with extension ports through which the respective three or more branch lines extend outside of the protective portion,
   fixing portions to which the first sheet and the second sheet are fixed to each other are provided adjacent to the extension port on the outer edge of the protective portion, and
   the fixing portions include a folded fixing portion in which one of the first sheet and the second sheet is folded back and fixed so as to overlap with an outer surface of the other of the first sheet and the second sheet.

2. The wire harness according to claim 1, wherein only a first folded fixing portion in which the first sheet is folded back to overlap with the outer surface of the second sheet is provided as the folded fixing portion.

3. The wire harness according to claim 1, wherein the folded fixing portion includes a first folded fixing portion in which the first sheet is folded back to overlap with the outer surface of the second sheet, and a second folded fixing portion in which the second sheet is folded back to overlap with the outer surface of the first sheet.

4. The wire harness according to claim 1, wherein a through hole for fixing the protective portion to a base of the seat is formed in the protective portion.

5. The wire harness according to claim 4, wherein the through hole is formed at a position at which the first sheet and the second sheet overlap with each other.

6. The wire harness according to claim 1, wherein the extension ports include a first extension port provided such that the branch lines are movable in and out of the protective portion.

7. The wire harness according to claim 1, wherein the extension ports include a second extension port obtained by wrapping a branch line among the branch lines and the protective portion with tape.

8. The wire harness according to claim 6,
   wherein the extension ports include a second extension port obtained by wrapping a branch line among the branch lines and the protective portion with tape,
   a branch line with the shortest length from the protective portion to a terminal portion of the branch line among the three or more branch lines extends from the first extension port, and
   a branch line with the longest length from the protective portion to a terminal portion of the branch line among the three or more branch lines extends from the second extension port.

9. A wire harness with a base, comprising
   the wire harness according to claim 1; and
   the base to be attached to the seat,
   wherein the protective portion is attached to the base.

10. The wire harness according to claim 1, wherein the first sheet and the second sheet are separate members, and
   the first sheet and the second sheet are made of a substantially same material.

\* \* \* \* \*